United States Patent
Otake

(10) Patent No.: US 9,108,629 B2
(45) Date of Patent: Aug. 18, 2015

(54) DRIVING ASSISTANCE DEVICE

(75) Inventor: Hirotada Otake, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 10 days.

(21) Appl. No.: 14/131,140

(22) PCT Filed: Aug. 2, 2011

(86) PCT No.: PCT/JP2011/067694
§ 371 (c)(1),
(2), (4) Date: Jan. 6, 2014

(87) PCT Pub. No.: WO2013/018198
PCT Pub. Date: Feb. 7, 2013

(65) Prior Publication Data
US 2014/0142797 A1    May 22, 2014

(51) Int. Cl.
*B60T 8/32*    (2006.01)
*B60Q 1/00*    (2006.01)
*B60W 20/00*   (2006.01)
(Continued)

(52) U.S. Cl.
CPC .............. *B60W 20/00* (2013.01); *B60W 10/06* (2013.01); *B60W 10/08* (2013.01); *B60W 10/18* (2013.01); *B60W 20/1062* (2013.01); *B60W 30/18109* (2013.01); *B60W 30/18127* (2013.01); *B60W 2050/146* (2013.01); *B60W 2550/22* (2013.01); *B60W 2550/402* (2013.01); *G08G 1/09626* (2013.01); *G08G 1/096716* (2013.01); *G08G 1/096775* (2013.01); *G08G 1/096783* (2013.01);
(Continued)

(58) Field of Classification Search
CPC .............. G08G 1/16; G08G 1/096775; G08G 1/096783; G08G 1/096791; B60W 20/00; B60W 10/06; B60W 10/08; B60W 10/18; G09G 2310/027; G09G 2310/0297; G09G 5/18; H02P 6/06; H02P 6/08
USPC ........... 701/23, 27, 36, 40–42, 45, 57, 58, 83, 701/84, 301, 302; 340/435, 436, 3.41, 903
See application file for complete search history.

(56) References Cited

U.S. PATENT DOCUMENTS

2009/0076698 A1 *  3/2009  Yokoyama et al. ............ 701/70

FOREIGN PATENT DOCUMENTS

| JP | 2007 024599 |   | 2/2007 |
| JP | 2009-126503 | * | 6/2009 |

(Continued)

OTHER PUBLICATIONS

International Search Report Issued Oct. 25, 2011 in PCT/JP2011/067694 Filed Aug. 2, 2011.

*Primary Examiner* — Muhammad Shafi
(74) *Attorney, Agent, or Firm* — Oblon, McClelland, Maier & Neustadt, L.L.P.

(57) ABSTRACT

A driving assistance apparatus includes an assistance apparatus that is capable of outputting driving assistance information for assisting driving of the vehicle on the basis of a target travel state quantity of a vehicle, and an assistance control apparatus that controls the assistance apparatus to change a mode of the driving assistance information between a time period from a first assistance timing based on the target travel state quantity to a second assistance timing, which is based on the target travel state quantity and subsequent to the first assistance timing, and a time period from the second assistance timing onwards, hence the driving assistance apparatus is capable of providing suitable driving assistance.

10 Claims, 8 Drawing Sheets

(51) Int. Cl.
  *B60W 30/18* (2012.01)
  *B60W 10/06* (2006.01)
  *B60W 10/08* (2006.01)
  *B60W 10/18* (2012.01)
  *B60W 50/14* (2012.01)
  *G08G 1/0962* (2006.01)
  *G08G 1/0967* (2006.01)
(52) U.S. Cl.
  CPC ......... *G08G 1/096791* (2013.01); *Y10S 903/93* (2013.01)

(56) References Cited

FOREIGN PATENT DOCUMENTS

| | | | |
|---|---|---|---|
| JP | 2010-009138 | * | 1/2010 |
| JP | 2010 244308 | | 10/2010 |
| JP | 2011 088551 | | 5/2011 |
| JP | 2011 121509 | | 6/2011 |
| JP | 2011 129139 | | 6/2011 |
| JP | 2011 141802 | | 7/2011 |

* cited by examiner

DRIVING ASSISTANCE DEVICE

TECHNICAL FIELD

The invention relates to a driving assistance apparatus.

BACKGROUND ART

There are conventional driving assistance apparatuses which are mounted in vehicles and output information for assisting the drivers driving vehicles. Patent Document 1, for example, discloses a conventional driving assistance apparatus of this kind, in which a driver is notified when to start deceleration in cases where the driver has to stop at traffic signals, on the basis of the arrival time period until reaching the traffic signals, and the color change time period of the traffic lights.

Patent Document 1: Japanese Patent Application Publication No. 2010-244308

SUMMARY OF THE INVENTION

The apparatus described in Patent Document 1 mentioned above provides assistance to prompt early deceleration by notifying a driver when to start deceleration, in cases where the driver has to stop at traffic signals, but there is scope for further improvement in respect of providing more suitable driving assistance, for example.

The invention was devised in view of the aforementioned circumstances, an object thereof being to provide a driving assistance apparatus capable of providing suitable driving assistance.

In order to achieve the object described above, the driving assistance apparatus relating to the present invention includes: an assistance apparatus that provides assistance for prompting a recommended driving operation by outputting driving assistance information for assisting driving of a vehicle on the basis of a target travel state quantity at a prescribed location of the vehicle to provide driving assistance in such a manner that a travel state quantity of the vehicle becomes the target travel state quantity at a prescribed location; and an assistance control apparatus that controls the assistance apparatus to change a mode of the driving assistance information between a time period from a first assistance timing based on a current travel state quantity of the vehicle and a target travel state quantity at a prescribed location to a second assistance timing, which is based on a current travel state quantity of the vehicle and a target travel state quantity at a prescribed location and which is subsequent to the first assistance timing, and a time period from the second assistance timing onwards.

Furthermore, in the driving assistance apparatus described above, the assistance control apparatus may change the mode of the driving assistance information as time passes, in the time period from the first assistance timing to the second assistance timing.

Moreover, in the driving assistance apparatus described above, the first assistance timing and the second assistance timing may be computed on the basis of the target travel state quantity and a rate of deceleration of the vehicle in a state where an acceleration request operation and a braking request operation to the vehicle are cancelled.

Furthermore, in the driving assistance apparatus described above, the target travel state quantity may be a recommended vehicle speed at which the braking request operation is recommended; and the first assistance timing and the second assistance timing may be computed on the basis of a same rate of deceleration of the vehicle travelling to a prescribed location, and different recommended vehicle speeds at different prescribed locations.

Furthermore, in the driving assistance apparatus described above, the target travel state quantity may be a recommended vehicle speed at which the braking request operation is recommended; and the first assistance timing and the second assistance timing may be computed on the basis of a same recommended vehicle speed at a same prescribed location, and different rates of deceleration of the vehicle travelling to a prescribed location.

Furthermore, the driving assistance apparatus described above may further include a deceleration rate control apparatus that controls a rate of deceleration of the vehicle until the braking request operation is performed, in accordance with a cancellation timing of the acceleration request operation in a time period from the first assistance timing to the second assistance timing.

Moreover, in the driving assistance apparatus described above, the vehicle may be a hybrid vehicle having an internal combustion engine and an electric motor as travel drive sources.

Furthermore, in the driving assistance apparatus described above, the assistance control apparatus may control the assistance apparatus on the basis of the target travel state quantity at a prescribed location.

Moreover, in the driving assistance apparatus described above, the assistance apparatus may provide assistance to prompt a recommended driving operation, by outputting the driving assistance information.

In order to achieve the object described above, the driving assistance apparatus relating to the invention includes: an assistance apparatus that is capable of outputting driving assistance information for assisting driving of a vehicle, on the basis of a target travel state quantity of the vehicle; and an assistance control apparatus that controls the assistance apparatus to change a mode of the driving assistance information as time passes from an assistance start timing based on the target travel state quantity.

The driving assistance apparatus according to the invention has a beneficial effect in being capable of providing suitable driving assistance.

MODES FOR CARRYING OUT THE INVENTION

Embodiments of the invention are described in detail below on the basis of the drawings. The invention is not limited by these embodiments. Furthermore, the constituent elements in the embodiments described below include elements which can be replaced or easily devised by a person skilled in the art, or elements which are substantially the same.

First Embodiment

Figure 1:
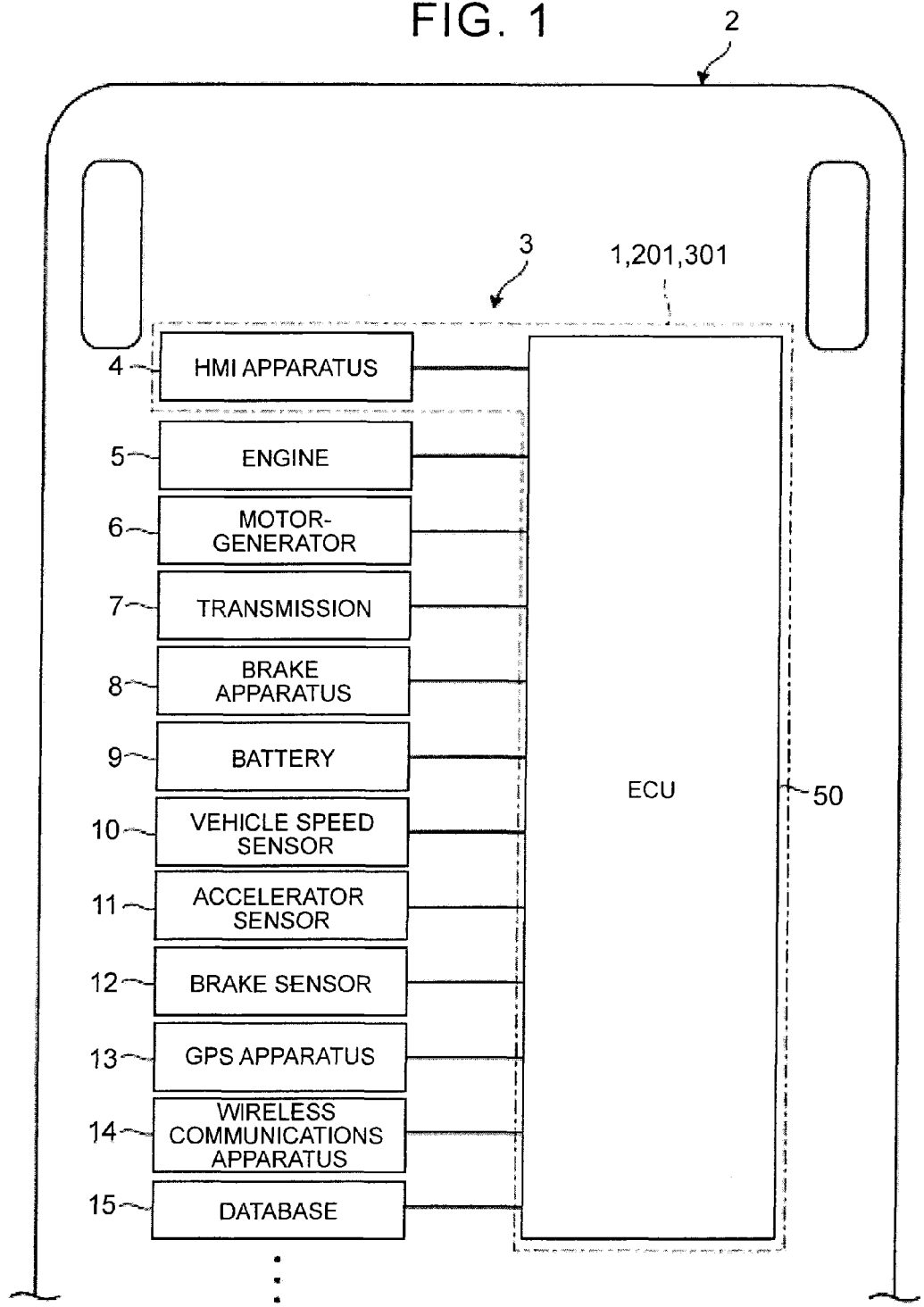
FIG. 1 is a schematic compositional drawing of a vehicle control system relating to a first embodiment.
Figure 2:
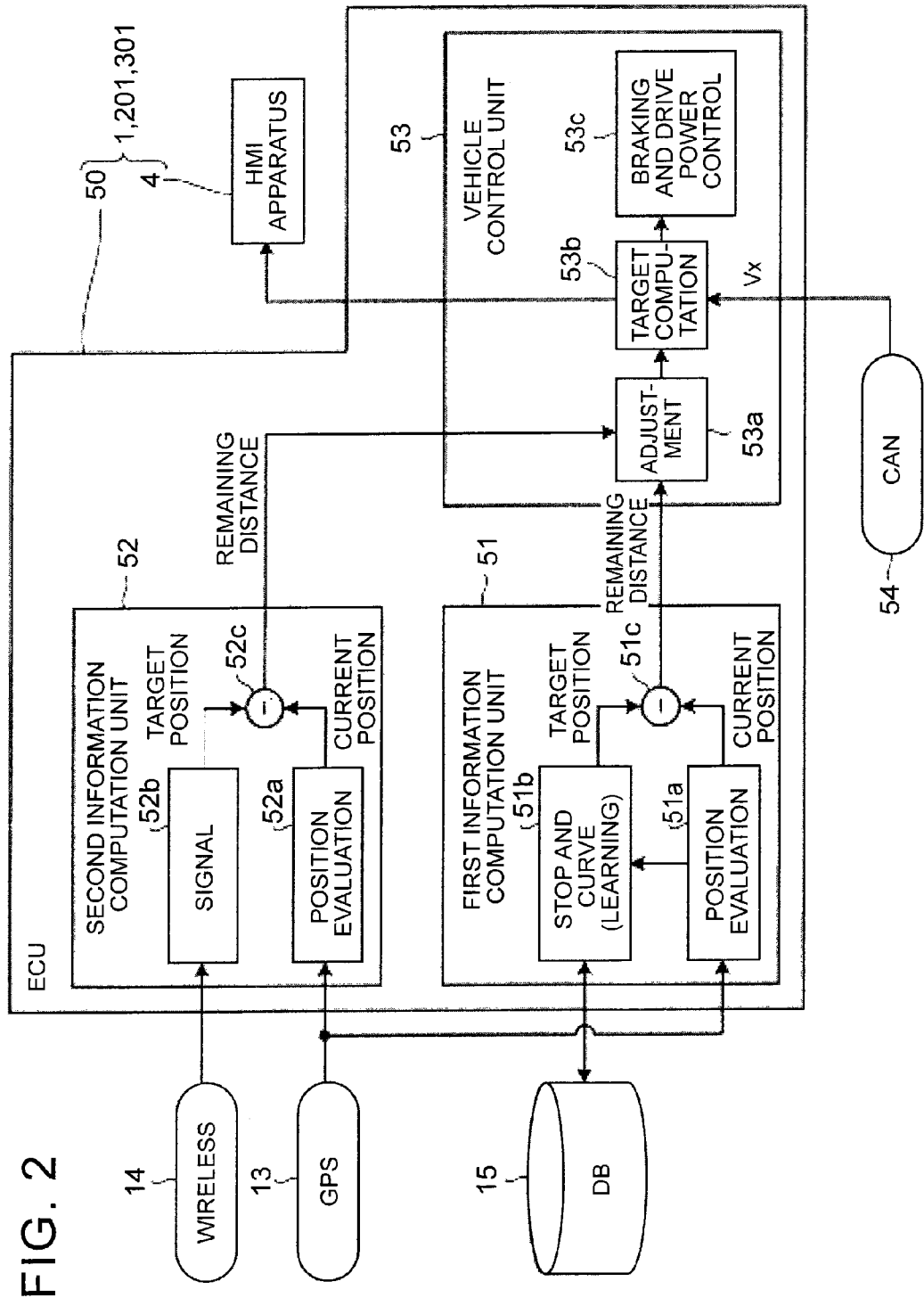
FIG. 2 is a block diagram showing one example of an approximate composition of an electronic control unit (ECU) relating to the first embodiment.
Figure 3:
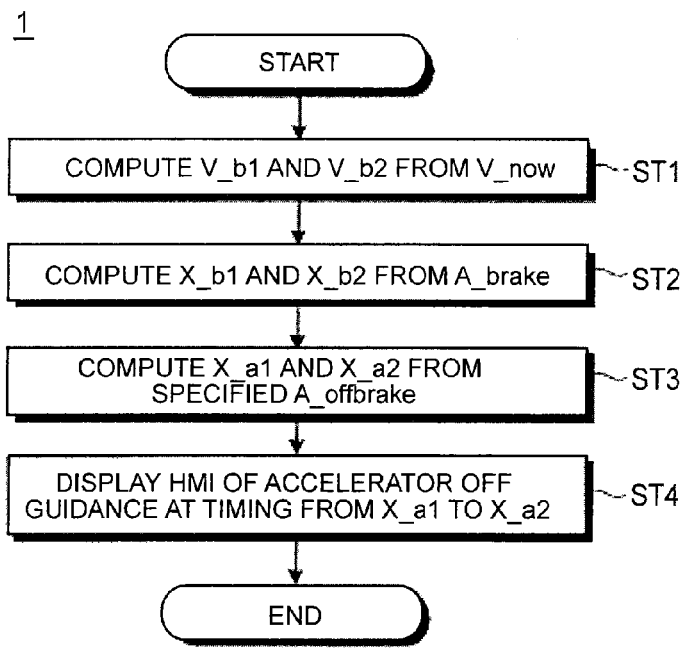
FIG. 3 is a flowchart showing one example of control by an ECU relating to the first embodiment.
Figure 4:
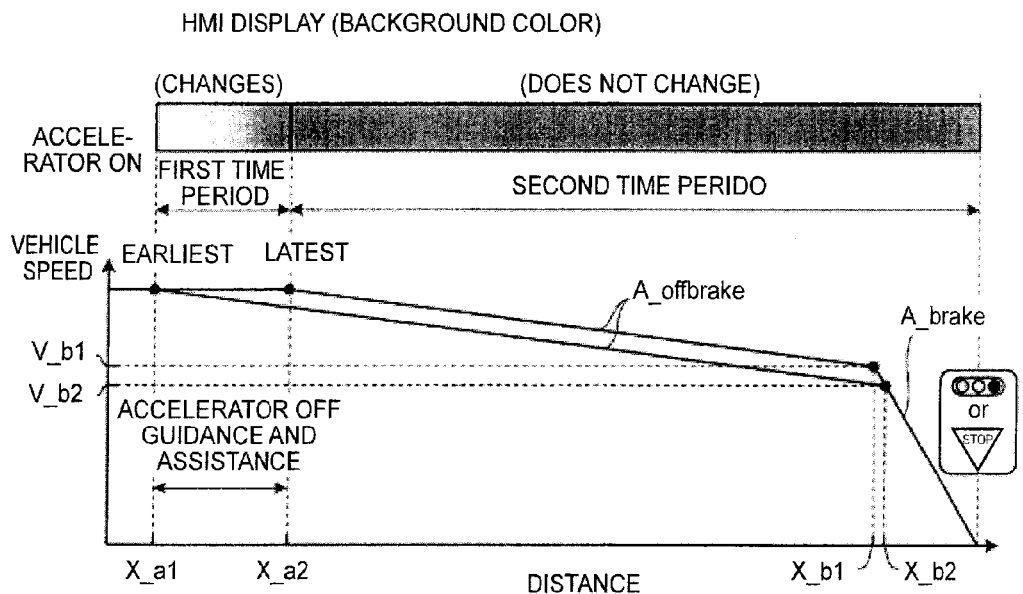
FIG. 4 is a schematic diagram showing a relationship between the vehicle speed and a remaining distance to a stop position, and one example of an assistance mode, in the vehicle control system relating to the first embodiment.
Figure 5:
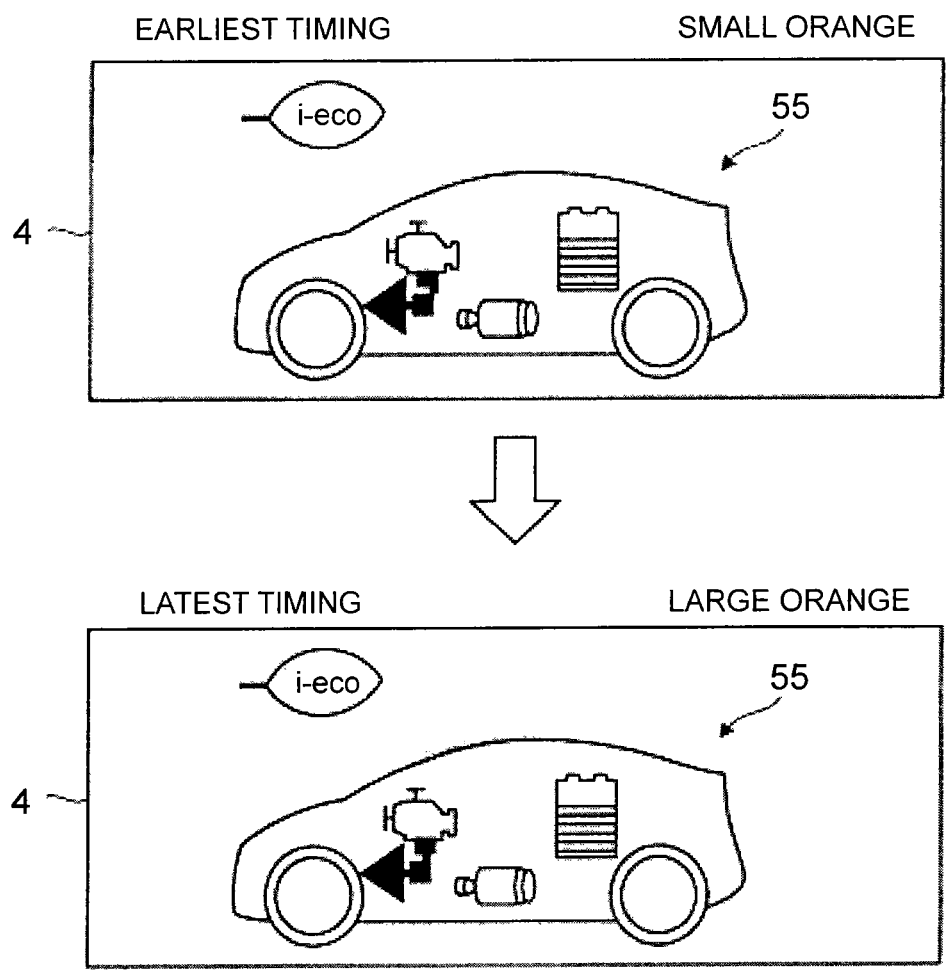
FIG. 5 is a schematic diagram showing one example of an assistance display mode by a human machine interface (HMI) apparatus relating to the first embodiment.

FIG. 1 is a schematic drawing showing a vehicle control system relating to a first embodiment; FIG. 2 is a block diagram showing one example of a schematic drawing of an ECU relating to the first embodiment; FIG. 3 is a flowchart showing one example of control performed by the ECU relating to the first embodiment; FIG. 4 is a schematic diagram showing one example of an assistance mode and a relationship between the vehicle speed and the remaining distance to a stop position in the vehicle control system relating to the first embodiment; and FIG. 5 is a schematic diagram showing one example of an assistance display mode according to an HMI apparatus relating to the first embodiment.

As shown in FIG. 1, the driving assistance apparatus 1 according to the embodiment is applied to a vehicle control system 3 which is mounted in a vehicle 2. The driving assistance apparatus 1 is provided with an HMI apparatus 4, which serves as an assistance apparatus, and an ECU 50. The driving assistance apparatus 1 assists driving of the vehicle 2 by a driver, by means of the ECU 50 controlling the HMI apparatus 4 and outputting various driving assistance information in accordance with the circumstances.

The vehicle control system 3 to which the driving assistance apparatus 1 of the embodiment is applied is an anticipatory economy driving assistance system which makes use of so-called anticipatory information. More specifically, the vehicle control system 3 utilizes anticipatory information to assist economical driving by the driver, by causing the driving assistance apparatus 1 to provide the driver with assistance to promote driving having a significant effect in improving fuel consumption. Accordingly, the vehicle control system 3 is a system which is composed so as to restrict usage of fuel and to improve fuel consumption. Typically, the driving assistance apparatus 1 guides and assists the operations performed by the driver by outputting driving assistance information with the aim of assisting economical driving by the driver.

Furthermore, the vehicle control system 3 according to the embodiment is a so-called hybrid system which combines an engine 5 and a motor-generator 6 as a travel drive source for driving rotation of the drive wheels of the vehicle 2. More specifically, the vehicle 2 is a hybrid vehicle in which a motor-generator 6 is provided as a travel drive source in addition to the engine 5. In the vehicle 2, the engine 5 is driven in as efficient a state as possible, and the motor-generator 6 is used to deal with excessive or insufficient drive power or engine braking force, as well as regenerating energy during deceleration and thereby achieving improvement in fuel consumption.

In the description given below, the vehicle control system 3 is a hybrid system which is provided with an engine 5 and a motor-generator 6 as travel drive sources, but the invention is not limited to this. The vehicle control system 3 may also be a system which is provided with an engine 5 as a travel drive source, but is not provided with a motor-generator 6, or a system which is provided with a motor-generator 6 as a travel drive source, but is not provided with an engine 5. More specifically, the vehicle 2 may also be a so-called conventional vehicle or electric vehicle (EV).

In other words, the vehicle control system 3 is constituted by an HMI apparatus 4, an engine 5 which is an internal combustion engine, a motor-generator 6 which is an electric device, a transmission 7, a brake apparatus 8, a battery 9, and the like. Furthermore, the vehicle control system 3 is constituted by a vehicle speed sensor 10, an accelerator sensor 11, a brake sensor 12, a global positioning system (GPS) apparatus (also called "GPS" below) 13, a wireless communications apparatus 14, and a database 15, and the like.

The HMI apparatus 4 is an assistance apparatus which can output driving assistance information, which is information for assisting driving of the vehicle 2, and provide driving assistance information to the driver. The HMI apparatus 4 is a vehicle-mounted device, which includes, for example, a display apparatus (visual information display apparatus) and a speaker (sound output apparatus), and the like, which are disposed inside the cabin of the vehicle 2. The HMI apparatus 4 may make use existing apparatuses, for example, the display apparatus of the navigation system, and the speakers, etc. The HMI apparatus 4 presents information and thereby guides the driving operation of the driver, by audio information and visual information (diagram information, text information), and the like, so as to be able to achieve improved fuel consumption. Through presenting information in this way, the HMI apparatus 4 assists the achievement of a target value by the driving operation performed by the driver. The HMI apparatus 4 is electrically connected to an ECU 50 and is controlled by the ECU 50. The HMI apparatus 4 may also include, for instance, a sensory information output apparatus, or the like, which outputs sensory information, such as steering wheel vibrations, seat vibrations, pedal resistance, or the like.

In the vehicle control system 3, an engine 5, a motor-generator 6, a transmission 7, a brake apparatus 8, a battery 9, and the like, are installed as various actuators for achieving travel of the vehicle 2.

The engine 5 applies drive power to the wheels of the vehicle 2, in accordance with an acceleration request operation performed by the driver, for example, a depressing operation of an accelerator pedal. The engine 5 consumes fuel and generates engine torque as a mechanical torque, to produce drive power for travel which is applied to the drive wheels of the vehicle 2. In short, the engine 5 is a thermal engine which outputs thermal energy generated by burning fuel, in the form of mechanical energy, such as torque, and examples thereof are a gasoline engine, a diesel engine, and a liquefied petroleum gas (LPG) engine, and the like. The engine 5 is, for example, provided with a fuel injection apparatus, an ignition apparatus and a throttle valve apparatus, and the like, which are not illustrated, and these apparatuses are electrically connected to the ECU 50 and are controlled by the ECU 50. The output torque of the engine 5 is controlled by the ECU 50. The drive power generated by the engine 5 may be used to generate electricity in the motor-generator 6.

The motor-generator 6 applies a drive power to the wheels of the vehicle 2 in accordance with an acceleration request operation performed by the drive, for example, a depressing operation of the accelerator pedal. The motor-generator 6 generates a motor torque by converting electrical energy to mechanical drive power, as a drive power for travel which is applied to the drive wheels of the vehicle 2. The motor-generator 6 is a rotary electrical machine which is provided with a stator, which is a fixed element, and a rotor, which is a rotating element. The motor-generator 6 is an electric motor which converts electrical energy into mechanical drive power and outputs this drive power, and is also an electric generator which recovers mechanical drive power by converting same into electrical energy. In other words, the motor-generator 6 combines a function as an electric motor which is driven by a supply of electric power, converts the electric energy to mechanical energy, and outputs this mechanical energy (drive function), and a function as an electric generator which converts mechanical energy into electric energy (regeneration function). The motor-generator 6 is electrically connected to the ECU 50 via an inverter, and the like, which converts direct current (DC) and alternate current (AC), and is controlled by the ECU 50. The output torque and the amount of generated electricity from the motor-generator 6 are controlled by the ECU 50 via the inverter.

The transmission 7 is a drive power transmission apparatus which changes the speed of the rotational output of the engine 5 and the motor-generator 6, and transmits the output to the drive wheels of the vehicle 2. The transmission 7 may be a so-called manual transmission (MT), or may be a so-called automatic transmission (AT), such as a stepped AT, a continuous variable transmission (CVT), a multi-mode MT (MMT), a sequential MT (SMT), a dual clutch transmission (DCT), or the like. Here, the transmission 7 is described as a continuous transmission using a planetary gear mechanism, or the like, for example. In the transmission 7, the transmission actuator, and the like, is electrically connected to the ECU 50, and is controlled by the ECU 50.

The brake apparatus 8 applies a braking force to the wheels of the vehicle 2 in accordance with a braking request operation performed by the driver, for example, in accordance with a depression operation of a brake pedal. The brake apparatus 8 applies a braking force to the wheels which are supported rotatably on the vehicle body of the vehicle 2, by generating a prescribed frictional force (frictional resistance) between frictional elements, such as a brake pad and a brake disk, for example. Because of this operation, the brake apparatus 8 generates a braking force between the ground and the wheels of the vehicle 2 and implements braking operation to the vehicle 2.

In the brake apparatus 8, the brake actuator, and the like, is electrically connected to the ECU 50, and is controlled by this ECU 50.

The battery 9 is a capacitor apparatus which is capable of storing power and discharging stored power. The battery 9 is connected electrically to the ECU 50, and outputs signals relating to various information to the ECU 50.

When functioning as a motor, the motor-generator 6 receives a supply of power stored in the battery 9, via the inverter, converts the supplied power to a travel drive power for the vehicle 2, and outputs this drive power. Furthermore, when functioning as a generator, the motor-generator 6 is driven to generate electricity by the input drive power, and the generated electric power is accumulated in the battery 9 via the inverter. In this case, the motor-generator 6 is able to brake the rotation of the rotor (regenerative braking) through the rotational resistance produced in the rotor. As a result of this, during regenerative braking, the motor-generator 6 is able to generate a motor regeneration torque, which is a negative motor torque, in the rotor, by regeneration of electric power, and consequently, a braking force can be applied to the drive wheels of the vehicle 2. More specifically, in the vehicle control system 3 a mechanical drive power is input to the motor-generator 6 from the drive wheels of the vehicle 2, and as a result of this, the motor-generator 6 generates electricity by regeneration, whereby the kinetic energy of the vehicle 2 can be recovered as electric energy. In accordance with this, by transmitting the mechanical drive power (negative motor torque) produced by the rotor of the motor-generator 6 to the drive wheels, the vehicle control system 3 is able to carry out regenerative braking by the motor-generator 6. In this case, if the amount of regeneration by the motor-generator 6 (the amount of generated electricity) is made relatively small by the vehicle control system 3, then the generated braking force is relatively small, and the deceleration acting on the vehicle 2 is relatively small. On the other hand, if the amount of regeneration by the motor-generator 6 (the amount of generated electricity) is made relatively large by the vehicle control system 3, then the generated braking force is relatively large and the deceleration acting on the vehicle 2 is relatively large.

The vehicle speed sensor 10, the accelerator sensor 11 and the brake sensor 12 are state detection apparatuses which detect the state of travel of the vehicle 2 and the inputs to the vehicle 2 by the driver (driver inputs), in other words, state quantities and physical quantities relating to the actual operation of the vehicle 2 by the driver. The vehicle speed sensor 10 detects the speed of the vehicle 2 (called "vehicle speed" below). The accelerator sensor 11 detects the degree of opening of the accelerator, which is the operation amount (depression amount) of the accelerator pedal by the driver. The brake sensor 12 detects the operation amount (depression amount) of the brake pedal by the driver, for example, by detecting a master cylinder pressure, or the like. The speed sensor 10, accelerator sensor 11 and brake sensor 12 are electrically connected to the ECU 50 and output detection signals to the ECU 50.

The GPS apparatus 13 is an apparatus which detects the current location of the vehicle 2. The GPS apparatus 13 receives a GPS signal output by a GPS satellite, and measures/computes GPS information, which is location information for the vehicle 2 (X coordinate: X; Y coordinate: Y), on the basis of the received GPS signal. The GPS apparatus 13 is electrically connected to the ECU 50, and outputs a signal relating to the GPS information, to the ECU 50.

The wireless communications apparatus 14 is an anticipatory information acquisition apparatus which acquires anticipatory information relating to the travel of the vehicle 2, by using wireless communications. The wireless communications apparatus 14 acquires anticipatory information by wireless communications from apparatuses which exchange information via a communications infrastructure, such as road-to-vehicle communications devices (roadside devices), like optical beacons arranged along the roadside, vehicle-to-vehicle communications devices installed in other vehicles, or a vehicle information and communication system (VICS) center, or the like, operating via the Internet, or the like. The wireless communications apparatus 14 acquires this anticipatory information, for instance, in the form of preceding vehicle information, trailing vehicle information, signal information, roadworks and traffic restriction information, congestion information, emergency vehicle information, information from an accident history database, and so on. For example, signal information includes location information for traffic signals in the forward direction of travel of the vehicle 2, and signal cycle information indicating the lighting cycles of the green, amber and red lights, and the signal change timings, and so on. The wireless communications apparatus 14 is connected electrically to the ECU 50 and outputs signals relating to anticipatory information, to the ECU 50.

The database 15 stores various information. The database 15 stores map information including road information, various data and learning information obtained during actual travel of the vehicle 2, and anticipatory information acquired by the wireless communications apparatus 14, and the like. For example, the road information includes road gradient information, road surface state information, road shape information, speed limit information, road curvature (curve) information, temporary stop information, stop line position information, and the like. The information stored in the database 15 is referred to, as appropriate, by the ECU 50, and required information is read out. The database 15 is depicted as being installed in the vehicle 2 here, but the invention is not limited to this and it is also possible to adopt a composition in which the database 15 is provided in an information center, or the like, which is external to the vehicle 2, and is referenced by the ECU 50 to read out required information, by wireless communications, or the like.

The ECU 50 is a control unit which implements overall control of the whole vehicle control system 3; for example, the ECU 50 can be composed as an electronic circuit based on a generic microcomputer including a central processing unit (CPU), a read only memory (ROM), a random access memory (RAM) and an interface. The detection results of the vehicle speed sensor 10, the accelerator sensor 11 and the brake sensor 12, and the GPS information acquired by the GPS apparatus 13, the anticipatory information acquired by the wireless communications apparatus 14, the various information stored in the database 15, the drive signals for respective parts, and electric signals corresponding to control commands, and the like, are input to the ECU 50. In response to the input electric signals, and the like, the ECU 50 controls the HMI apparatus 4, the engine 5, the motor-generator 6, the transmission 7, the brake apparatus 8, the battery 9, and the like. The ECU 50 implements, for example, drive control of the engine 5 on the basis of the degree of opening of the accelerator and the vehicle speed, etc., drive control of the motor-generator 6, transmission control of the transmission 7, braking control of the brake apparatus 8, and the like. Furthermore, the ECU 50 can implement various vehicle travel (travel modes) in the vehicle 2, by combining or selectively using the engine 5 and the motor-generator 6, in accordance with the driving state, for example.

Furthermore, the ECU 50 is able to detect switching on and off of the accelerator, which is an acceleration request operation with respect to the vehicle 2 performed by the driver, on the basis of the detection result of the accelerator sensor 11, for example. Similarly, the ECU 50 is able to detect switching on and off of the brake, which is a braking request operation with respect to the vehicle 2 performed by the driver, on the basis of the detection result of the brake sensor 12, for example. A state where the accelerator operation performed by the driver is off is a state where the driver has cancelled an acceleration request operation with respect to the vehicle 2, and a state where the accelerator operation performed by the driver is on is a state where the driver is performing a braking request operation with respect to the vehicle 2.

Similarly, a state where the braking operation performed by the driver is off is a state where the driver cancels the braking request operation to the vehicle 2 is cancelled, and meanwhile a state where the braking operation by the driver is on is a state where the driver performs the braking request operation to the vehicle 2.

The driving assistance apparatus 1 includes the HMI apparatus 4 and the ECU 50 described above. The driving assistance apparatus 1 provides assistance to prompt the driver to perform driving having a high effect in improving fuel consumption, by means of the ECU 50 controlling the HMI apparatus 4 to output various driving assistance information, in accordance with the circumstances. The driving assistance apparatus 1 provides guidance and assistance to prompt a recommended driving operation to the driver, typically, a driving operation which involves changes, by means of the HMI apparatus 4 outputting various operation assistance information in accordance with the control implemented by the ECU 50, on the basis of a target travel state quantity for the vehicle 2 during travel. Here, the target travel state quantity is typically a travel state quantity of the vehicle 2 in a prescribed location or at a prescribed timing, in the vehicle 2 during travel. The ECU 50 of the driving assistance apparatus 1 controls the HMI apparatus 4 on the basis of the target travel state quantities at the prescribed location or the prescribed timing, and the HMI apparatus 4 outputs driving assistance information, and provides assistance prompting the driver to perform a recommended driving operation, whereby driving assistance is performed in such a manner that the travel state quantity of the vehicle 2 becomes the target travel state quantity at the prescribed location or prescribed timing.

The driving assistance apparatus 1 according to the embodiment outputs driving assistance information so as to apply a margin to the timing of prompting the recommended driving operation to the driver, rather than pinpointing a timing of prompting the recommended driving operation to the driver. Consequently, the driving assistance apparatus 1 achieves suitable driving assistance which restricts the strange impression caused to the driver by the driving assistance. Moreover, here, the driving assistance apparatus 1 changes the mode of prompting the recommended driving operation to the driver, in accordance with change in time. Accordingly, the driving assistance apparatus 1 makes the driver readily understand that a margin has been applied to the timing of prompting the recommended driving operation, and the driver is made readily to appreciate the driving assistance provided by the driving assistance apparatus 1, and as a result of this, more suitable driving assistance is achieved.

The ECU 50 according to the embodiment controls the HMI apparatus 4, and varies the mode of the driving assistance information, in a first period from an earliest timing which is a first assistance timing to a latest timing which is a second assistance timing, and in a second timer period from the latest timing onwards. The HMI apparatus 4 outputs the driving assistance information in a first mode during the first time period from the earliest timing to the latest timing. On the other hand, the HMI apparatus 4 outputs the driving assistance information in a second mode, which is different to the first mode, during the second period from the latest timing onwards.

Here, the earliest timing and the latest timing are both timings which are decided on the basis of a target travel state quantity, and the latest timing is a timing after the earliest timing in a time series. The earliest timing is the earliest timing at which the travel state quantity of the vehicle 2 is to become the target travel state quantity, at the prescribed location, by the driver performing the recommended driving operation, and this is also the assistance start timing by the driving assistance apparatus 1. On the other hand, the latest timing is the latest timing at which the travel state quantity of the vehicle 2 is to become the target travel state quantity, at the prescribed location, by the driver performing the recommended driving operation.

In other words, by the driver performing the recommended driving operation in the first time period from the earliest timing to the latest timing, the travel state quantity of the vehicle 2 will already have become the target travel state quantity, by the prescribed location. The driving assistance apparatus 1 can provide driving assistance in such a manner that the travel state quantity of the vehicle 2 becomes the target travel state quantity at a prescribed location or a prescribed timing, by outputting driving assistance information by the HMI apparatus 4 so as to prompt the driver to perform a recommended driving operation, in such a manner that the driver performs the recommended driving operation in the first time period from the earliest timing to the latest timing.

The ECU 50 according to the embodiment changes the state of the driving assistance information over the passage of time, in the first time period from the earliest timing to the latest timing. In other words, the ECU 50 changes the mode of the driving assistance information in accordance with the passage of time from the earliest timing, which is the assistance start timing. On the other hand, the ECU 50 according to the embodiment fixes the mode of the driving assistance information in the second time period from the latest timing onwards. More specifically, the first mode of the driving assistance information in the first time period is a mode in which the driving assistance information is changed as time passes. On the other hand, the second mode of the driving assistance information in the second time period is a mode in which the driving assistance information is not changed as time passes.

Here, one example of a schematic composition of the ECU 50 will be described with reference to the block diagram in FIG. 2.

Here, the target travel state quantity is described by taking, as an example, a target brake operation start speed, which is a recommended vehicle speed at which a brake operation (braking request operation) by the driver is recommended. Furthermore, an accelerator off operation (an operation of cancelling an accelerator request operation) is described as one example of a recommended driving operation by which the driving assistance apparatus 1 assists the driver. Moreover, it is supposed that the driving assistance apparatus 1 outputs visual information as one example of driving assistance information. The driving assistance apparatus 1 is described here as displaying an image of visual information as driving assistance information on a visual information display apparatus, such as a center meter, heads-up display (HUD), front windscreen-superimposed display, liquid crystal display panel, or the like, which constitutes the HMI apparatus 4.

In other words, due to the driver performing an accelerator off operation in the first time period from the earliest timing to the latest timing, the speed of the vehicle 2 becomes approximately the target brake operation start speed at the prescribed location. In other words, the first time period from the earliest timing to the latest timing is an optimal acceleration off time period. The driving assistance apparatus 1 displays an image of the driving assistance information by the HMI apparatus 4 to prompt an accelerator off operation, in such a manner that the driver performs an accelerator off operation in the first time period from the earliest timing to the latest timing. Consequently, the driving assistance apparatus 1 is able to provide driving assistance in such a manner that the speed of the vehicle 2 becomes the target brake operation start speed at the prescribed location and the prescribed timing.

More specifically, as shown by the example in FIG. 2, the ECU 50 includes a first information computation unit 51, a second information computation unit 52, and a vehicle control unit 53. The first information computation unit 51 and the second information computation unit 52 are computation units which are compatible with an intelligent transport system (ITS), for example, and are for the purpose of infrastructure coordination and navigational coordination. The vehicle control unit 53 is a control unit for controlling various units of the vehicle 2. The vehicle control unit 53 is connected to an actuator ECU or sensor which controls various actuators, such an engine control ECU, a motor-generator control ECU, a transmission control ECU, a brake control ECU, a battery control ECU, or the like, via a control area network (CAN) 54 which is constructed as an in-vehicle network. The ECU 50 is not limited to this, and may also include a navigational apparatus, in addition to the first information computation unit 51.

The first information computation unit 51 computes the remaining distance from the vehicle 2 to a temporary stop or a curve in the forward direction of travel, on the basis of static infrastructure information, for example, map information, or the like, which includes road information. Furthermore, the first information computation unit 51 learns the normal driving behavior of the driver, and based on this, makes an estimation of the driving behavior and learns/predicts the deceleration and stopping behavior of the driver. The first computation unit 51 also computes the remaining distance from the vehicle 2 to a position where the vehicle decelerates and stops (may be called a "deceleration and stop position" below) in the forward direction of travel. Here, the deceleration and stop position obtained by learning the normal driving behavior of the driver is, for example, a position where there is a high frequency of the driver decelerating and stopping (hereinafter sometimes referred to as "deceleration and stop"), apart from temporary stops.

The first information computation unit 51 may carry out learning of the deceleration and stopping behavior of the driver on the basis of various information obtained by actual travel of the vehicle 2, in other words, learning of deceleration and stop positions corresponding to the driver. For example, on the basis of various information obtained during actual travel of the vehicle 2, the first information computation unit 51 learns the habits and tendencies of the driving operation, from the normal driving of the driver, in association with the person (for example, the attributes of the driver), the location (for example, the place where the operation is performed), the circumstances (for example, the time band, etc.) and the like. For instance, the first information computation unit 51 learns deceleration and stop positions, or the like, where there is a high frequency of a temporary stop or of the driver decelerating and stopping, by statistical processing of the accelerator on and off operations and brake on and off operations performed by the driver. The first information computation unit 51 stores the learnt information in a database 15, as learning information.

In functional terms, the first information computation unit 51 is provided with a location evaluation unit 51a, a temporary stop and curve information acquisition unit (which may be called "stop and curve information acquisition unit" below) 51b, and a subtracter 51c. The location evaluation unit 51a acquires GPS information via the GPS apparatus 13 and acquires the current location information of the vehicle 2 (a host vehicle). The location evaluation unit 51a outputs this current location information to the stop and curve information acquisition unit 51b and the subtracter 51c. The stop and curve information acquisition unit 51b refers to map information stored in the database 15, various information obtained by actual travel of the vehicle 2, and learning information, on the basis of the current location information input from the location evaluation unit 51a, and acquires target location information indicating a temporary stop, curve or deceleration and stop position in the forward direction of travel of the vehicle 2. The stop and curve information acquisition unit 51b outputs this target location information to the subtracter 51c. The subtracter 51c computes the differential between the location of the vehicle 2 as indicated by the current location information input from the location evaluation unit 51a, and a temporary stop, curve or deceleration and stop position indicated by target location information input from the stop and curve information acquisition unit 51b, and computes the remaining distance to the temporary stop, curve or deceleration and stop position. The subtracter 51c outputs remaining distance information indicating this remaining distance, to an adjustment unit 53a of the vehicle control unit 53.

The second information computation unit 52, for example, computes the remaining distance from the vehicle 2 to a stop position due to a red signal in the forward direction of travel, on the basis of dynamic infrastructure information, such as signal information, or the like.

In functional terms, the second information computation unit 52 is provided with a location evaluation unit 52a, a signal information acquisition unit 52b, and a subtracter 52c. The location evaluation unit 52a acquires current location information for the vehicle 2 by acquiring GPS information via the GPS apparatus 13. The location evaluation unit 52a outputs this current location information to the subtracter 52c. The signal information acquisition unit 52b acquires signal information via the wireless communications apparatus 14, and acquires target location information indicating a stop position due to a red signal in the forward direction of travel of the vehicle 2, on the basis of this signal information. The signal information acquisition unit 52b outputs the target location information to the subtracter 52c. The subtracter 52c computes a differential between the location of the vehicle 2 indicated by the current location information input from the location evaluation unit 52a, and the stop position due to a red light indicated by the target location information input from the signal information acquisition unit 52b, and computes a remaining distance to the stop position due to a red signal. The subtracter 52c outputs remaining distance information indicating this remaining distance to the adjustment unit 53a of the vehicle control unit 53.

The vehicle control unit 53 performs comprehensive control of the HMI apparatus 4 and the drive power of the vehicle 2, on the basis of the remaining distance to the temporary stop, curve or deceleration and stop position computed by the first information computation unit 51, the remaining distance to a stop position due to a red signal computed by the second information computation unit 52, the speed Vx of the vehicle 2, and the on/off switching of the accelerator operation and the brake operation.

In functional terms, the vehicle control unit 53 is provided with an adjustment unit 53a, a target computation unit 53b and a braking and drive power control unit 53c. The adjustment unit 53a adjusts the remaining distance information to the temporary stop, curve or deceleration and stop position input from the subtracter 51c and the remaining distance information to the stop position due to a red light input from the subtracter 52c. For example, the adjustment unit 53a adjusts the remaining distance information on the basis of the accuracy of the remaining distance information, or the relative size of the remaining distance, and so on, and outputs the adjustment result to the target computation unit 53b.

The target computation unit 53b computes a target travel state quantity on the basis of the adjustment result of the remaining distance information input from the adjustment unit 53a, the speed Vx of the vehicle 2 input from the vehicle speed sensor 10 via a CAN 54, or the like, and so on. The target computation unit 53b controls the HMI apparatus 4 on the basis of this target travel state quantity. Furthermore, the target computation unit 53b computes the earliest timing and the latest timing for guiding and assisting an accelerator off operation via the HMI apparatus 4, on the basis of the target travel state quantity, and controls the HMI apparatus 4 to output driving assistance information accordingly.

Here, one example of computation of the earliest timing and the latest timing by the target computation unit 53b and the driving assistance provided by the HMI apparatus 4 are described with reference to FIGS. 3, 4 and 5. In the example in FIG. 4, a case is described in which the object is driving assistance in respect of a temporary stop or a stop position due to a red signal, but the procedure is substantially similar in a case where the object is driving assistance in respect of a curve where a brake operation by the driver is predicted. Here, if the object is driving assistance in respect of a curve where a brake operation by the driver is predicted, then the procedure differs from the example in FIG. 4 in that the brake operation by the driver may end in a state where the speed of the vehicle 2 is greater than zero (this applies similarly to the embodiments given below).

The target computation unit 53b computes the earliest timing and the latest timing on the basis of the target travel state quantity and the accelerator off deceleration rate. Here, the accelerator off deceleration rate corresponds to the rate of deceleration of the vehicle 2 when the acceleration operation and the brake operation are off (when an acceleration request operation and a braking request operation to the vehicle 2 are both cancelled). Furthermore, for instance, the target travel state quantity is the target brake operation start speed at which a brake operation by the driver is recommended, as described above, and the target computation unit 53b computes the earliest timing and the latest timing on the basis of the same accelerator off deceleration rate and different target brake operation start speeds.

As shown in FIGS. 3 and 4, firstly, the target computation unit 53b computes a target brake operation start upper limit speed V_b1 and a target brake operation start lower limit speed V_b2, as different target brake operation start speeds, on the basis of the current speed (approach speed) V_now of the vehicle 2 (ST1). The target computation unit 53b computes the target brake operation start upper limit speed V_b1 by multiplying the vehicle speed V_now by a prescribed upper limit speed coefficient. The target computation unit 53b computes the target brake operation start lower limit speed V_b2 by multiplying the vehicle speed V_now by a prescribed lower limit speed coefficient which is smaller than the upper limit speed coefficient. The upper limit speed coefficient is, for example, set in such a manner that the target brake operation start upper limit speed V_b1 is a speed at which the driver of the vehicle 2 or the driver of a following vehicle is not given the impression of emergency braking when a braking on operation is performed. The lower limit speed coefficient is, for example, set in such a manner that the target brake operation start lower limit speed V_b2 is a speed at which a stop position can be reached without causing stress to the driver of the vehicle 2 or a driver of a following vehicle, due to an excessively slow speed of the vehicle 2, after performing an accelerator off operation and until performing a brake on operation.

Next, the target computation unit 53b computes a target brake operation start earliest position X_b1 and a target brake operation start latest position X_b2 as prescribed points, on the basis of the target brake operation start upper limit speed V_b1 and the target brake operation start lower limit speed V_b2, and a previously established target brake deceleration rate A_brake (ST2).

The target brake deceleration rate A_brake is, for example, set previously as a fixed value in accordance with a rate of deceleration that does not give the driver the impression of emergency braking or cause a strange impression, when the driver performs a brake on operation. Here, moreover, since the vehicle control system 3 is a hybrid system, then more desirably, the target brake deceleration rate A_brake is set to a rate of deceleration having some margin with respect to a regeneration upper limit deceleration rate at which regeneration can be performed efficiently by the motor-generator 6. Furthermore, desirably, the target brake deceleration rate A_brake is set in accordance with a rate of deceleration at which the deceleration requested in accordance with a brake operation by the driver can be satisfied by regenerative braking by the motor-generator 6. In this case, in the vehicle control system 3, which is a hybrid system, provided that the rate of deceleration requested in accordance with a brake operation by the driver is equal to or lower than the target brake deceleration rate, then it is possible to stop the vehicle 2 at the stop position by regenerative braking by the motor-generator 6, without requiring friction braking by the brake apparatus 8. In this case, the vehicle control system 3 is able to regenerate the kinetic energy of the vehicle 2 efficiently as electrical energy by braking regeneration in accordance with the brake operation by the driver, without consuming the kinetic energy of the vehicle 2 in the form of thermal energy by friction braking, and hence a good effect in improving the fuel consumption can be expected.

The target computation unit 53b computes a target brake operation start earliest position X_b1 on the basis of the target brake operation start upper limit speed V_b1 and the target brake deceleration rate A_brake, by taking, as a reference position, a stop position corresponding to the remaining distance adjusted by the adjustment unit 53a. In other words, the target computation unit 53b performs a reverse calculation of the brake operation start position by which the vehicle 2 can be stopped at the stop position, if the vehicle 2 travelling at the target brake operation start upper limit speed V_b1 is decelerated at the target brake deceleration rate A_brake by a brake operation, and sets this as the target brake operation start earliest position X_b1.

Similarly, the target computation unit 53b computes the target brake operation start latest position X_b2 on the basis of the target brake operation start lower limit speed V_b2 and the target brake deceleration rate A_brake, by taking, as a reference position, a stop position corresponding to the remaining distance adjusted by the adjustment unit 53a. In other words, the target computation unit 53b performs a reverse calculation of the brake operation start position by which the vehicle 2 can be stopped at the stop position, if the vehicle 2 travelling at the target brake operation start lower limit speed V_b2 is decelerated at the target brake deceleration rate A_brake by a brake operation, and sets this as the target brake operation start latest position X_b2.

The combination of the target brake operation start earliest position X_b1, which is a prescribed location, and the target brake operation start upper limit speed V_b1, which is a target travel state quantity, corresponds to a combination of the earliest brake operation start position and the brake operation start speed by which the vehicle can approach the stop position at the optimal target brake deceleration rate A_brake, when the driver performs a brake operation. The combination of the target brake operation start latest position X_b2, which is a prescribed location, and the target brake operation start lower limit speed V_b2, which is a target travel state quantity, corresponds to a combination of the latest brake operation start position and the brake operation start speed by which the vehicle can approach the stop position at the optimal target brake deceleration rate A_brake, when the driver performs a brake operation.

The vehicle control system 3 is able to cause the vehicle 2 to stop at the stop position at the optimal target brake deceleration rate A_brake or lower, by the driver performing a brake operation in a state where the vehicle 2 is located in a range from the target brake operation start earliest position X_b1 to the target brake operation start latest position X_b2, and the vehicle speed is in a range from the target brake operation start upper limit speed V_b1 to the target brake operation start lower limit speed V_b2. Here, the driving assistance apparatus 1 guides and assists an accelerator off operation by the driver in the first time period from the earliest timing until the latest timing, in such a manner that the vehicle speed comes within a range from the target brake operation start upper limit speed V_b1 to the target brake operation start lower limit speed V_b2, when the vehicle 2 enters into a range from the target brake operation start earliest position X_b1 to the target brake operation start latest position X_b2. Therefore, the driving assistance apparatus 1 is able to provide suitable guidance in such a manner that the rate of deceleration requested in accordance with the brake operation is equal to or lower than the optimal target brake deceleration rate A_brake, when the driver actually carries out a brake operation in order to stop at the stop position.

Next, the target computation unit 53b computes an accelerator off guidance earliest position X_a1 and an accelerator off guidance latest position X_a2 on the basis of the target brake operation start earliest position X_b1 and the target brake operation start latest position X_b2, and a previously established specified accelerator off deceleration rate A_offbrake (ST3).

The accelerator off deceleration rate A_offbrake is the rate of deceleration of the vehicle 2 when the accelerator operation and the brake operation are both off. The accelerator off deceleration rate A_offbrake is set previously as a fixed value on the basis of, for example, the engine braking torque produced by rotational resistance in the engine 5, the transmission braking torque produced by rotational resistance in the transmission 7, and in the case of a hybrid system such as that of the embodiment, the motor regeneration torque corresponding to the regeneration amount produced by the motor-generator 6.

The target computation unit 53b computes the accelerator off guidance earliest position X_a1 on the basis of the accelerator off deceleration rate A_offbrake and the target brake operation start lower limit speed V_b2, by taking the target brake operation start latest position X_b2 as a reference position. More specifically, the target computation unit 53b performs a reverse calculation of the accelerator operation off position by which the speed of the vehicle 2 is to become the target brake operation start lower limit speed V_b2 at the target brake operation start latest position X_b2, when the vehicle 2 is decelerated at the accelerator off deceleration rate A_offbrake, and sets this as the accelerator off guidance earliest position X_a1.

Similarly, the target computation unit 53b computes the accelerator off guidance earliest position X_a1, on the basis of the accelerator off deceleration rate A_offbrake and the target brake operation start upper limit speed V_b1, by taking the target brake operation start earliest position X_b1 as a reference position. In other words, the target computation unit 53b performs a reverse calculation of the acceleration operation off position by which the speed of the vehicle 2 is to become the target brake operation start upper limit speed V_b1 at the target brake operation start earliest position X_b1, when the vehicle 2 decelerates at the accelerator off deceleration rate A_offbrake, and sets this as the accelerator off guidance latest position X_a2.

The target computation unit 53*b* outputs driving assistance information relating to the accelerator off guidance and assistance in a first time period from the earliest timing at which the vehicle 2 will reach the accelerator off guidance earliest position X_a1 at the current speed until the latest timing at which the vehicle 2 will reach the accelerator off guidance latest position X_a2, to the HMI apparatus 4. The HMI apparatus 4 displays an HMI relating to accelerator off guidance and assistance, as driving assistance information (ST4), whereupon the current control period terminates and the procedure transfers to the next control period.

The target computation unit 53*b* according to the embodiment varies the display mode of the driving assistance information, between the first time period from the earliest timing to the latest timing which are computed as described above, and a second time period from the latest timing onwards. In other words, the target computation unit 53*b* changes between a mode of driving assistance information from the earliest timing to the latest timing and a mode of driving assistance information from the latest timing onwards. More specifically, the target computation unit 53*b* changes the display mode of the driving assistance information on either side of a boundary which is the latest timing.

Here, the first mode of the driving assistance information in the first time period is a mode in which the displayed driving assistance information is changed as time passes. In other words, the first time period from the earliest timing to the latest timing is a changing display period in the driving assistance on the HMI apparatus 4.

The target computation unit 53*b* gradually changes the display mode of the driving assistance information on the HMI apparatus 4, from the earliest timing towards the latest timing. For example, as shown in the upper part of FIG. 4 and in FIG. 5, the target computation unit 53*b* gradually changes the background color 55 of a car icon on the center meter which constitutes the HMI apparatus 4. For instance, the target computation unit 53*b* gradually changes the background color 55 from a colorless state to a dark orange color, or gradually enlarges the range of the background color 55, as the time advances from the earliest timing to the latest timing. In this way, the target computation unit 53*b* achieves a first display mode of the driving assistance information in the HMI apparatus 4, in the first time period from the earliest timing to the latest timing. Consequently, the driving assistance apparatus 1 can prompt an accelerator off operation by the driver in a progressive manner, in the first time period from the earliest timing to the latest timing.

On the other hand, the second mode of the driving assistance information in the second time period is a display mode which does not change the driving assistance information as time passes. In other words, the second time period from the latest timing onwards is a fixed display time period in the driving assistance provided by the HMI apparatus 4. In this case, for example, the target computation unit 53*b* keeps the background color 55 unchanged at a dark orange color. In this way, the target computation unit 53*b* achieves a second display mode of the driving assistance information in the HMI apparatus 4, in the second time period from the latest timing onwards. Therefore, the driving assistance apparatus 1 can prompt an accelerator off operation to the driver by a stronger representation, during the second period from the latest timing onwards.

Consequently, the driving assistance apparatus 1 can guide and assist an accelerator off operation by the driver, in the first time period from the earliest timing to the latest timing. Therefore, the driving assistance apparatus 1 is able to guide and assist the timing of the acceleration off operation by the driver, in such a manner that the speed comes within a range from the target brake operation start upper limit speed V_b1 to the target brake operation start lower limit speed V_b2, when the vehicle 2 enters into a range from the target brake operation start earliest position X_b1 to the target brake operation start latest position X_b2. As a result of this, the driving assistance apparatus 1 is able to provide suitable guidance in such a manner that the rate of deceleration requested in accordance with the brake operation becomes the optimal target brake deceleration rate A_brake or lower when the driver actually performs a brake operation in order to stop at the stop position. Accordingly, the driving assistance apparatus 1 is able to assist the driver without giving the driver the impression of sudden braking, when the driver performs a brake on operation, and in this case, a significant effect in improving fuel consumption can be achieved.

The driving assistance apparatus 1 according to the embodiment is able to achieve suitable driving assistance which suppresses the strange impression caused to the driver, by outputting driving assistance information so as to apply a margin to the timing of prompting a recommended driving operation to the driver. More specifically, the driving assistance apparatus 1 is able to provide driving assistance which factors in a reaction time until the driver actually performs an accelerator off operation after seeing and assessing the display, by displaying the driving assistance information so as to have a time margin, rather than pinpointing a timing for prompting an accelerator off operation to the driver. The reaction time until actually performing an accelerator off operation is subject to individual differences between drivers, and varies with the demands on the driver, such as the prevailing traffic situation. However, the driving assistance apparatus 1 is able to provide suitable driving assistance regardless of variations in the reaction times, and the like, by giving driving assistance in which a margin is applied to the timing at which an accelerator off operation is prompted.

Furthermore, by providing driving assistance in which a margin is imparted to the timing of prompting the accelerator off operation, then even if there is fluctuation in the actual timing of the accelerator off operation, the driving assistance apparatus 1 is able to keep this fluctuation within a previously predicted range, and the effects on subsequent driving and control operations can be minimized. By guiding and assisting an accelerator off operation within the range of a first time period from the earliest timing to the latest timing, for example, the driving assistance apparatus 1 is able to restrict the occurrence of sudden braking when, for instance, a brake on operation is performed while the speed of the vehicle 2 is too high close before the stop position. Furthermore, by guiding and assisting an accelerator off operation in the range of the first time period from the earliest timing to the latest timing, the driving assistance apparatus 1 is able to restrict the occurrence of stress caused to the driver of the vehicle 2 or the driver of a following vehicle due, for instance, to the speed of the vehicle 2 being too low before the stop position.

Furthermore, here, by changing the assistance mode when prompting an accelerator off operation to the driver, as time passes from the earliest timing, the driving assistance apparatus 1 is able to make the driver readily understand that there is a margin in the timing of prompting the accelerator off operation. As a result of this, the driving assistance apparatus 1 makes it possible to convey the driving assistance provided by the driving assistance apparatus 1 more readily to the driver, whereby more suitable driving assistance can be achieved.

The braking and drive power control unit 53c controls the braking and drive power, when the driver actually performs an accelerator off operation in the first time period from the earliest timing to the latest timing, to adjust the actual rate of deceleration of the vehicle 2 so as to become the specified accelerator off deceleration rate A_offbrake. Here, since the vehicle control system 3 is a hybrid system, then the braking and drive power control unit 53c executes regenerative engine braking expansion control, in which regeneration for engine braking is carried out by the motor-generator 6 in addition to normal engine braking, and the like, such that the rate of deceleration becomes the specified accelerator off deceleration rate A_offbrake. The regeneration for engine braking based on this regenerative engine braking expansion control tends to have little effect on the amount of heat produced during regeneration, and therefore tends to have a relatively high regeneration efficiency, compared to braking regeneration corresponding to a brake on operation performed by the driver as described above. Consequently, the vehicle control system 3 can secure a relatively long time period for implementing this regenerative engine braking expansion control, through the driving assistance apparatus 1 guiding and assisting the accelerator off operation by the driver at a suitable timing, and therefore an enhanced effect in improving fuel consumption can be expected.

Furthermore, when the driver actually performs an accelerator off operation in the first time period from the earliest timing to the latest timing, the target computation unit 53b outputs driving assistance information indicating that an accelerator off operation has been performed suitably in accordance with the regenerative engine braking expansion control, to the HMI apparatus 4. The HMI apparatus 4 displays an HMI indicating that an accelerator off operation has been performed suitably, as driving assistance information, by changing the background color 55 to green, or the like, for example. Consequently, the driving assistance apparatus 1 is able to inform the driver that he or she has achieved driving that contributes to improving the fuel consumption.

The vehicle control system 3 is able to obtain an effect in improving fuel consumption, even if the driver has actually performed an accelerator off operation in the second time period after the latest timing. In this situation, there are cases where, for example, the vehicle control system 3 stops the vehicle 2 at the stop position by also using friction braking by the brake apparatus 8 in addition to regenerative braking by the motor-generator 6, due to the fact that the rate of deceleration requested in accordance with a brake operation by the driver is greater than the target brake deceleration rate A_brake. In this case, although a portion of the kinetic energy of the vehicle 2 is consumed as thermal energy by the frictional braking and hence the regeneration efficiency of the kinetic energy of the vehicle 2 is somewhat reduced, the vehicle control system 3 is able to ensure a prescribed effect in improving fuel consumption since the remainder of the kinetic energy of the vehicle 2 can be recovered as electrical energy by regenerative braking.

According the embodiment described above, the driving assistance apparatus 1 is provided with a HMI apparatus 4 which is capable of outputting driving assistance information for assisting driving of the vehicle 2 on the basis of a target brake operation start speed of the vehicle 2, and an ECU 50 which controls the HMI apparatus 4 and changes the mode of the driving assistance information between a time period from the earliest timing based on the target brake operation start speed until a latest timing, which is based on the target brake operation start speed and which is subsequent to the earliest timing, and a time period from the latest timing onwards.

According to the embodiment described above, the driving assistance apparatus 1 is provided with an HMI apparatus 4 which can output driving assistance information for assisting driving of the vehicle 2 on the basis of the target brake operation start speed of the vehicle 2, and an ECU 50 which controls the HMI apparatus 4 to change the mode of driving assistance information as time passes from an earliest timing based on the target brake operation start speed.

Therefore, the driving assistance apparatus 1 is able to assist the driver with the driving of the vehicle 2 in a readily comprehensible way at a suitable timing, and therefore suitable driving assistance can be provided, for example, economy driving by the driver can be assisted suitably, thereby suppressing the usage of fuel and improving fuel consumption.

In the description given above, the driving assistance apparatus 1 is described by taking the vehicle 2 to be a hybrid vehicle, but the invention is not limited to this and may also provide driving assistance suitably in a conventional vehicle or an EV.

Second Embodiment

Figure 6:
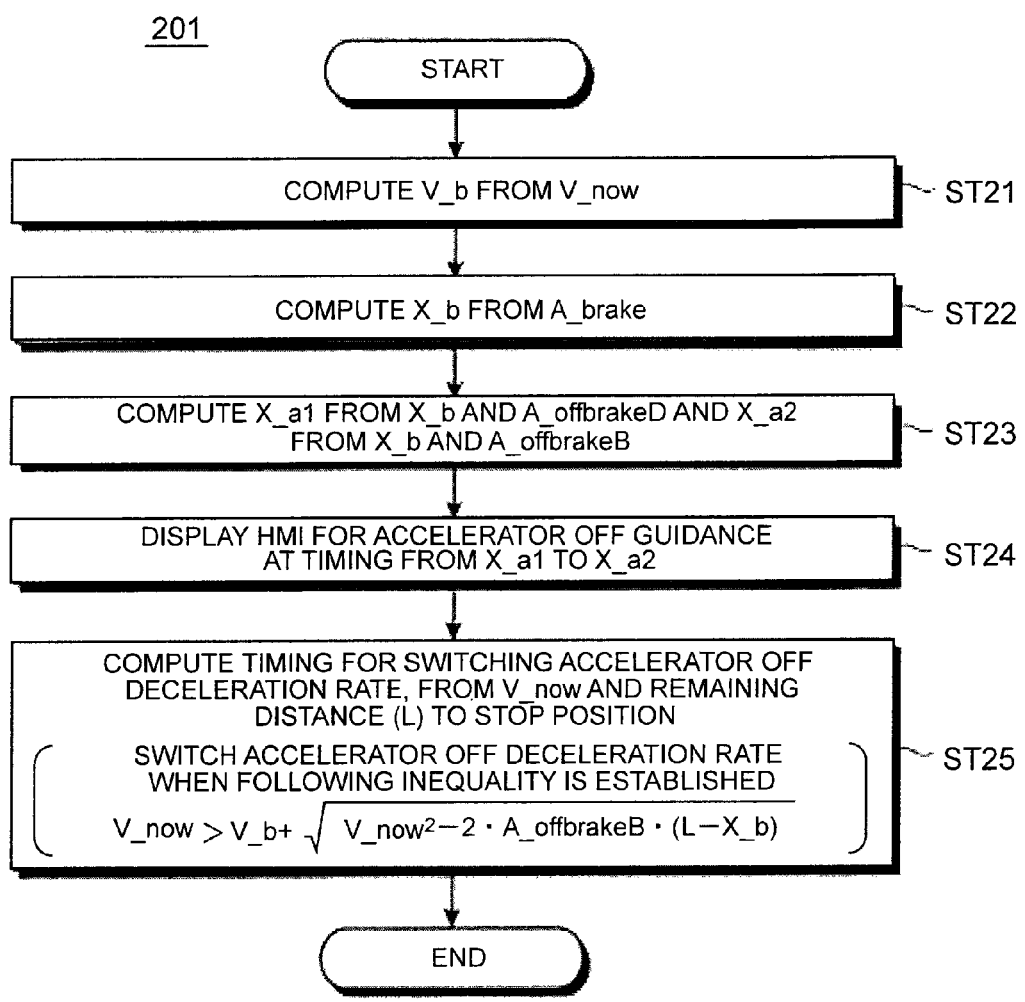
FIG. 6 is a flowchart showing one example of control by an ECU relating to a second embodiment.
Figure 7:
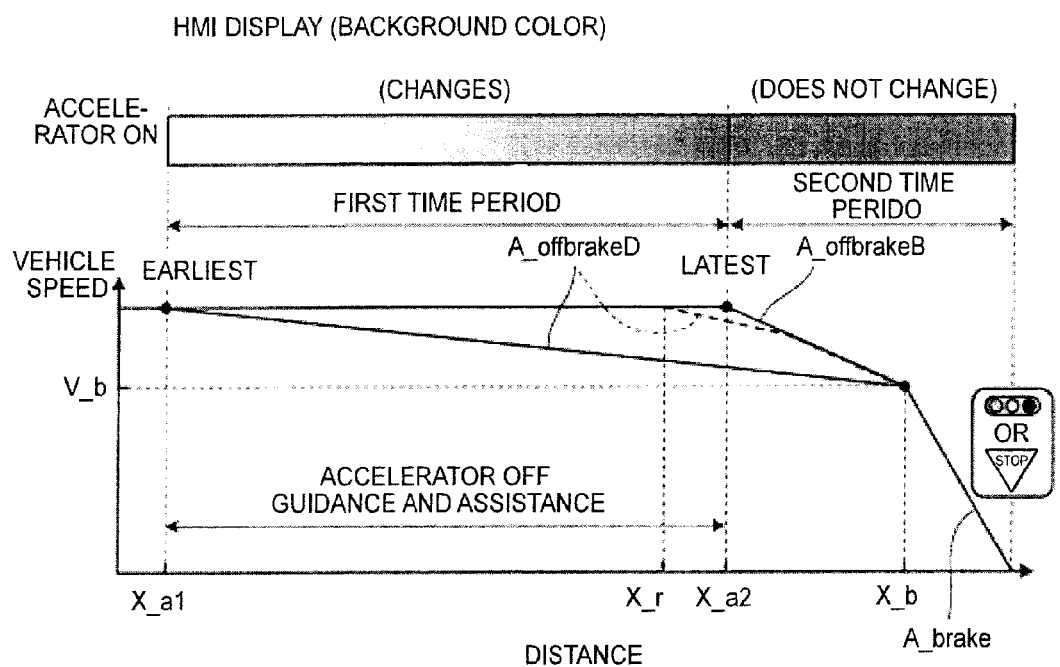
FIG. 7 is a schematic diagram showing a relationship between the vehicle speed and a remaining distance to a stop position, and one example of an assistance mode, in the vehicle control system relating to the second embodiment.

FIG. 6 is a flowchart showing one example of control performed by the ECU relating to a second embodiment; and FIG. 7 is a schematic drawing showing one example of an assistance mode and a relationship between a remaining distance to a stop position and a vehicle speed in the vehicle control system relating to the second embodiment. The driving assistance apparatus relating to the second embodiment differs from the first embodiment in that the rate of deceleration of the vehicle is changed in a state where the acceleration request operation and the braking request operation in relation to the vehicle are cancelled. Apart from this, duplicated description of the composition, action and beneficial effects which are common with the embodiment described above is omitted as far as possible. Furthermore, reference is made to FIGS. 1 and 2, etc. in relation to the respective compositional parts of the driving assistance apparatus relating to the second embodiment (the same applies below).

The driving assistance apparatus 201 relating to the embodiment can change the rate of deceleration of the vehicle 2 when the acceleration operation and the brake operation are off, in other words, the accelerator off deceleration rate A_offbrake. As stated previously, the accelerator off deceleration rate A_offbrake is determined on the basis of the engine braking torque produced by rotational resistance in the engine 5, the transmission braking torque produced by rotational resistance in the transmission 7, and in the case of a hybrid system as in the embodiment, the motor regeneration torque corresponding to the regeneration amount of the motor-generator 6, and the like. The driving assistance apparatus 201 is able to change the accelerator off deceleration rate A_offbrake by, for instance, changing the speed ratio (gear) of the transmission 7 and/or the regeneration amount of the motor-generator 6.

The driving assistance apparatus 201 changes the accelerator off deceleration rate A_offbrake in accordance with the remaining distance to the stop position at the timing of the actual accelerator off operation by the driver. Therefore, provided that an actual acceleration off operation is performed within the first time period from the earliest timing to the latest timing, the driving assistance apparatus 201 is able to make the combination of the actual brake operation start position and brake operation start speed substantially the same, regardless of the timing of the accelerator off operation. In other words, the driving assistance apparatus 201 is able to achieve a suitable combination of the brake operation start position and the brake operation start speed, by adjusting the accelerator off deceleration rate A_offbrake, even if there is variation in the timing of the actual accelerator off operation within the first time period from the earliest timing to the latest timing.

In the driving assistance apparatus 201 according to the embodiment, the ECU 50 functions as a deceleration rate control apparatus, as well as an assistance control apparatus. The ECU 50 changes the accelerator off deceleration rate A_offbrake by changing the speed ratio (gear) of the transmission 7 and the regeneration amount of the motor-generator 6, in stepwise fashion. Here, for example, the ECU 50 can change the accelerator off deceleration rate A_offbrake in two steps, namely, a first deceleration rate which is an accelerator off drive-range deceleration rate A_offbrakeD and a second deceleration rate which is an accelerator off brake-range deceleration rate A_offbrakeB. The accelerator off drive-range deceleration rate A_offbrakeD corresponds to the accelerator off deceleration rate when a drive range is selected as the shift range. The accelerator off brake-range deceleration rate A_offbrakeB corresponds to the accelerator off deceleration rate when a brake range is selected as the shift range, and is a rate of deceleration having a larger absolute value relative to the accelerator off drive-range deceleration rate A_offbrakeD. The ECU 50 changes the timing of switching between the accelerator off drive-range deceleration rate A_offbrakeD and the accelerator off brake-range deceleration rate A_offbrakeB, in accordance with the timing of the actual accelerator off operation by the driver.

Below, with reference to FIGS. 6 and 7, one example of the calculation of the earliest timing and the latest timing by the target computation unit 53b according to the embodiment, and the assistance and guidance by the HMI apparatus 4, will be described.

The target computation unit 53b computes the earliest timing and the latest timing on the basis of the target travel state quantity and the accelerator off deceleration rate. Moreover, here, as stated previously, the target travel state quantity is the target brake operation start speed at which a brake operation by the driver is recommended, and the target computation unit 53b according to the embodiment computes an earliest timing and a latest timing on the basis of the same target brake operation start speed and different accelerator off deceleration rates.

As shown in FIGS. 6 and 7, firstly, the target computation unit 53b computes the target brake operation start speed V_b on the basis of current speed (approach speed) V_now of the vehicle 2 (ST21). The target computation unit 53b multiplies the vehicle speed V_now by a prescribed speed coefficient to calculate the target brake operation start speed V_b. The speed coefficient is, for example, set in such a manner that the target brake operation start speed V_b is a speed at which the driver of the vehicle 2 and a driver of a following vehicle are not given the impression of sudden braking when a brake on operation is performed, and a speed at which the vehicle 2 can reach the stop position without causing stress due to the speed of the vehicle 2 being too slow.

Next, the target computation unit 53b computes the target brake operation start position X_b as a prescribed location, on the basis of the target brake operation start speed V_b and a previously established target brake deceleration rate A_brake (ST22).

The target computation unit 53b computes the target brake operation start position X_b on the basis of the target brake operation start speed V_b and the target brake deceleration rate A_brake, by taking a stop position corresponding to the remaining distance adjusted by the adjustment unit 53a as a reference position. In other words, the target computation unit 53b performs a reverse calculation of the brake operation start position by which the vehicle 2 is stopped at the stop position when the vehicle 2 travelling at the target brake operation start speed V_b is decelerated at the target brake deceleration rate A_brake by a brake operation, and sets this as the target brake operation start position X_b. The combination of the target brake operation start position X_b, which is a prescribed location, and the target brake operation start speed V_b, which is a target travel state quantity, corresponds to the combination of the brake operation start position and the brake operation start speed by which the vehicle can approach the stop position at an optimal target brake deceleration rate A_brake when the driver performs a brake operation.

Thereupon, the target computation unit 53b computes the accelerator off guidance earliest position X_a1 and the accelerator off guidance latest position X_a2 on the basis of the target brake operation start position X_b, and the previously established accelerator off drive-range deceleration rate A_offbrakeD and accelerator off brake-range deceleration rate A_offbrakeB (ST23).

The target computation unit 53b computes the accelerator off guidance earliest position X_a1 on the basis of the accelerator off drive-range deceleration rate A_offbrakeD and the target brake operation start speed V_b, by taking the target brake operation start position X_b as a reference position. In other words, the target computation unit 53b performs a reverse calculation of the accelerator off position at which the speed of the vehicle 2 can be brought to the target brake operation start speed V_b at the target brake operation start position X_b when the vehicle 2 is decelerated at the accelerator off drive-range deceleration rate A_offbrakeD, and sets this as the accelerator off guidance earliest position X_a1.

Similarly, the target computation unit 53b computes the accelerator off guidance latest position X_a2 on the basis of the accelerator off brake-range deceleration rate A_offbrakeB and the target brake operation start speed V_b, by taking the target brake operation start position X_b as a reference position. More specifically, the target computation unit 53b performs a reverse calculation of the accelerator off operation position by which the speed of the vehicle 2 can be brought to the target brake operation start speed V_b at the target brake operation start position X_b, when the vehicle 2 is decelerated at the accelerator off brake-range deceleration rate A_offbrakeB, and this is set as the accelerator off guidance latest position X_a2.

The target computation unit 53b outputs, to the HMI apparatus 4, driving assistance information relating to the accelerator off guidance and assistance in the first time period from the earliest timing at which the vehicle 2 reaches the accelerator off guidance earliest position X_a1 at the current speed to the latest timing at which the vehicle 2 reaches the accelerator off guidance latest position X_a2 at the current speed. The HMI apparatus 4 displays an HMI relating to accelerator off guidance and assistance, as driving assistance information (ST24).

The target computation unit 53b varies the display mode of the assistance and guidance information between a first time period from the earliest timing to the latest timing computed as described above, and a second time period from the latest timing onwards. The first mode of the driving assistance information in the first time period is a mode which changes the displayed driving assistance information as time passes. On the other hand, the second mode of the driving assistance information in the second time period is a display mode in which the driving assistance information is not changed as time passes. Consequently, the driving assistance apparatus 201 is able to guide and assist an accelerator off operation by the driver in the first time period from the earliest timing to the latest timing.

The braking and drive power control unit 53c controls the braking and drive power, when the driver actually performs an accelerator off operation in the first time period from the earliest timing to the latest timing, to adjust the actual rate of deceleration of the vehicle 2 so as to become the specified accelerator off drive-range deceleration rate A_offbrakeD. During this, the braking and drive power control unit 53c executes regenerative engine braking expansion control so as to carry out regeneration for engine braking by the motor-generator 6, in addition to normal engine braking, and the like.

The braking and drive power control unit 53c according to the embodiment computes the timing at which to switch the accelerator off deceleration rate, on the basis of the current speed V_now of the vehicle 2 and the remaining distance L to the stop position from the current position X_r at the timing of the actual accelerator off operation by the driver. The braking and drive power control unit 53c switches the accelerator off deceleration rate from the accelerator off drive-range deceleration rate A_offbrakeD to the accelerator off brake-range deceleration rate A_offbrakeB, at the timing that the inequality in Expression (1) below is established, for example. The braking and drive power control unit 53c adjusts the actual rate of deceleration of the vehicle 2 to become the accelerator off brake-range deceleration rate A_offbrakeB (ST25), the current control period terminates, and the procedure transfers to the next control period.

[Expression 1]

$$V\_now > V\_b + \sqrt{V\_now^2 - 2 \cdot A\_offbrakeB \cdot (L - X\_b)} \quad (1)$$

In Expression (1) above, [V_now] represents the current speed of the vehicle 2 when the driver performs an accelerator off operation. [V_b] represents the target brake operation start speed. [A_offbrakeB] represents the accelerator off brake-range deceleration rate. [L] represents the remaining distance from the current position to the stop position at the timing of the actual accelerator off operation performed by the driver. [X_b] represents the target brake operation start position.

The driving assistance apparatus 201 having the composition described above can guide and assist the timing of an accelerator off operation by the driver, in such a manner that the vehicle speed becomes the target brake operation start speed V_b when the vehicle 2 reaches the target brake operation start position X_b, by displaying driving assistance information in a first mode during the first time period from the earliest timing to the latest timing. As a result of this, the driving assistance apparatus 201 can provide suitable guidance in such a manner that the deceleration rate requested in accordance with a brake operation is equal to or lower than the optimal target brake deceleration rate A_brake, when the driver actually performs a brake operation in order to stop at a stop position, and therefore it is possible to achieve a significant effect in improving fuel consumption.

In this case, the driving assistance apparatus 201 decides the earliest timing and the latest timing on the basis of the same target brake operation start speed and different accelerator off deceleration rates, and therefore the first time period from the earliest timing to the latest timing can be set to a relatively long time period. Consequently, the driving assistance apparatus 201 can prevent the first time period from the earliest timing to the latest timing from becoming too short, and is therefore able to provide more suitable driving assistance to the driver.

Even if there is variation in the timing of the actual accelerator off operation within the first time period from the earliest timing to the latest timing, the driving assistance apparatus 201 can achieve a suitable combination of the actual brake operation start position and brake operation start speed, by adjusting the accelerator off deceleration rate. In other words, the driving assistance apparatus 201 is able to make the combination of the actual brake operation start position and brake operation start speed substantially the same, regardless of the timing of the accelerator off operation, provided that the actual accelerator off operation is performed within the first time period from the earliest timing to the latest timing. As a result of this, the driving assistance apparatus 201 is able to suppress the occurrence of variation in the combination of the actual brake operation start position and brake operation start speed, in relation to the combination of the target brake operation start position and target brake operation start speed by which the vehicle can approach the stop position at the optimal target brake deceleration rate A_brake when the driver performs a brake operation.

The driving assistance apparatus 201 according to the embodiment described above is able to assist the driver with driving of the vehicle 2 in a readily comprehensible way at a suitable timing, and therefore suitable driving assistance can be achieved, for example, economy driving by the driver can be assisted suitably, thereby suppressing the usage of fuel and improving fuel consumption.

Moreover, according to the driving assistance apparatus 201 relating to the embodiment described above, the target travel state quantity is the target brake operation start speed, and the earliest timing and latest timing are computed on the basis of the same target brake operation start speed and different accelerator off deceleration rates. Consequently, the driving assistance apparatus 201 can prevent the first time period from the earliest timing to the latest timing from becoming too short, and is therefore is able to provide more suitable driving assistance to the driver.

Moreover, in the driving assistance apparatus 201 relating to the embodiment described above, an ECU 50 is provided to control the deceleration rate of the vehicle 2 until a brake operation is performed, in accordance with the timing of an accelerator off operation (cancellation timing) during a first time period from the earliest timing to the latest timing. Therefore, the driving assistance apparatus 201 is able to prevent the combination of the brake operation start position and the brake operation start speed from being other than the target combination, and consequently, the occurrence of variation in the combination of the actual brake operation start position and brake operation start speed can be suppressed and it is possible to avoid causing a strange impression to the driver.

Third Embodiment

Figure 8:
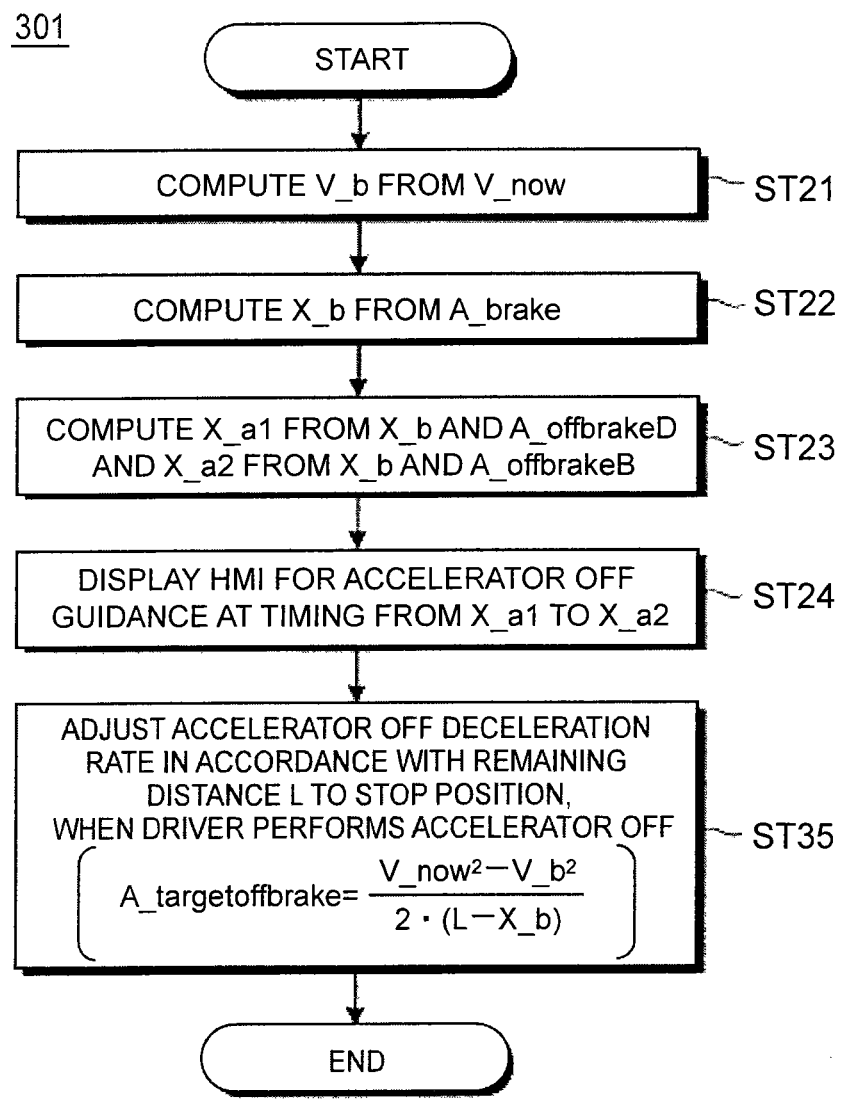
FIG. 8 is a flowchart showing one example of control by an ECU relating to a third embodiment.
Figure 9:
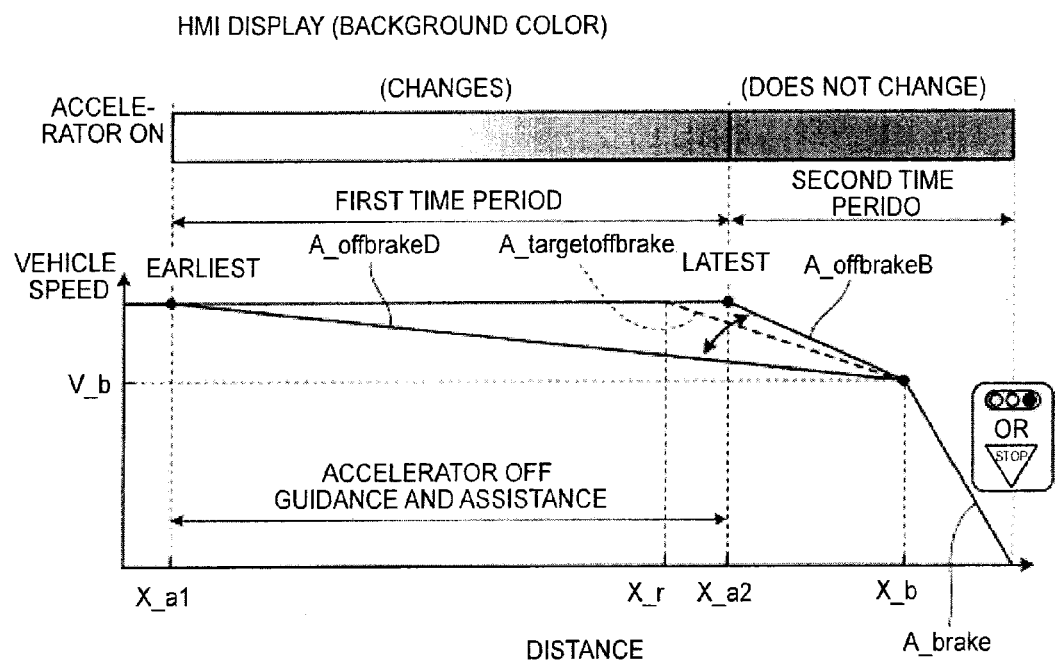
FIG. 9 is a schematic diagram showing a relationship between the vehicle speed and a remaining distance to a stop position, and one example of an assistance mode, in the vehicle control system relating to the third embodiment.

FIG. 8 is a flowchart showing one example of control by the ECU relating to a third embodiment, and FIG. 9 is a schematic drawing of one example of an assistance mode and a relationship between the remaining distance to the stop position and the vehicle speed, in the vehicle control system relating to the third embodiment. The driving assistance apparatus relating to the third embodiment is different to the second embodiment in that the rate of deceleration of the vehicle can be changed in a continuous (stepless) fashion.

In the driving assistance apparatus 301 according to the embodiment, the ECU 50 also serves as a deceleration rate control apparatus, as well as an assistance control apparatus. The ECU 50 according to the embodiment changes the accelerator off deceleration rate A_offbrake in a continuous fashion, by continuously changing the speed ratio (gear) of the transmission 7 and the regeneration amount in the motor-generator 6. If the vehicle control system 3 to which this driving assistance apparatus 301 is applied is composed so as to change the accelerator off deceleration rate A_offbrake, continuously, by means of the ECU 50 continuously changing the speed ratio of the transmission 7, then a continuous variable AT, or the like, which can continuously change the speed ratio is adopted as the transmission 7.

Here, for example, the ECU 50 is able to change the accelerator off deceleration rate A_offbrake continuously between the accelerator off drive-range deceleration rate A_offbrakeD and the accelerator off brake-range deceleration rate A_offbrakeB.

Below, examples of computation of the earliest timing and the latest timing by the target computation unit 53b and guiding assistance by the HMI apparatus 4 according to the embodiment are described with reference to FIGS. 8 and 9.

The target computation unit 53b computes the earliest timing and the latest timing on the basis of the same target brake operation start speed and different accelerator off deceleration rates, as described above. The target computation unit 53b outputs, to the HMI apparatus 4, driving assistance information relating to the accelerator off guidance and assistance in the first time period from the earliest timing at which the vehicle 2 reaches the accelerator off guidance earliest position X_a1 at the current speed to the latest timing at which the vehicle 2 reaches the accelerator off guidance latest position X_a2 at the current speed. The HMI apparatus 4 displays an HMI relating to accelerator off guidance and assistance, as driving assistance information (ST24).

The target computation unit 53b changes the display mode of the driving assistance information between the first time period from the earliest timing to the latest timing which have been computed, and the second time period from the latest timing onwards. The first mode of the driving assistance information in the first time period is a mode in which the displayed driving assistance information is changed as time passes. On the other hand, the second mode of the driving assistance information in the second time period is a display mode which does not change the driving assistance information as time passes. Consequently, the driving assistance apparatus 301 can guide and assist an accelerator off operation by the driver, in a first time period from the earliest timing to the latest timing.

The braking and drive power control unit 53c controls the braking and drive power, when the driver actually performs an accelerator off operation in the first time period from the earliest timing to the latest timing, to adjust the actual rate of deceleration of the vehicle 2 so as to become an optimal rate of deceleration between the accelerator off drive-range deceleration rate A_offbrakeD and the accelerator off brake-range deceleration range A_offbrakeB. During this, the braking and drive power control unit 53c executes regenerative engine braking expansion control so as to carry out regeneration for engine braking by the motor-generator 6, in addition to normal engine braking, and the like.

The braking and drive power control unit 53c according to the embodiment computes the target accelerator off deceleration rate on the basis of the current speed of the vehicle 2 V_now and the remaining distance L to the stop position from the current position X_r at the timing of the actual accelerator off operation performed by the driver, and adjusts the actual accelerator off deceleration rate so as to become the target accelerator off deceleration rate (ST35), whereupon the current control period terminates and the procedure transfers to the next control period. The braking and drive power control unit 53c uses Expression (2) below, for example, to calculate the target accelerator off deceleration rate A_targetoffbrake.

[Expression 2]

$$A\_targetoffbrake = \frac{V\_now^2 - V\_b^2}{2 \cdot (L - X\_b)} \quad (2)$$

In Expression (2) above, [A_targetoffbrake] represents the target accelerator off deceleration rate. [V_now] represents the current speed of the vehicle 2 when the driver performs an accelerator off operation. [V_b] represents the target brake operation start speed. [L] represents the remaining distance to the stop position from the current position at the timing of the actual accelerator off operation performed by the driver. [X_b] represents a target brake operation start position.

The driving assistance apparatus 301 configured as described above is able to guide and assist the timing of an accelerator off operation by the driver, in such a manner that the vehicle speed becomes the target brake operation start speed V_b when the vehicle 2 reaches the target brake operation start position X_b, by displaying driving assistance information in a first mode during the first time period from the earliest timing to the latest timing. As a result of this, the driving assistance apparatus 301 can provide suitable guidance in such a manner that the rate of deceleration requested in accordance with a brake operation is equal to or lower than the optimal target brake deceleration rate A_brake, when the driver actually performs a brake operation in order to stop at the stop position, and is therefore able to achieve a significant effect in improving fuel consumption.

In this case, the driving assistance apparatus 301 is able to set the first time period from the earliest timing to the latest timing to a relatively long period, since the earliest timing and the latest timing are decided on the basis of the same target brake operation start speed and different accelerator off deceleration rates. Consequently, the driving assistance apparatus 301 can prevent the first time period from the earliest timing to the latest timing from becoming too short, and is therefore able to provide more suitable driving assistance to the driver.

The driving assistance apparatus 301 is able to achieve a suitable combination of the actual brake operation start position and the brake operation start speed by adjusting the accelerator off deceleration rate continuously in accordance with the timing of the actual accelerator off operation, even if there is variation in the timing of the actual accelerator off operation within the first time period from the earliest timing to the latest timing. In other words, the driving assistance apparatus 301 is able to make the combination of the actual brake operation start position and brake operation start speed substantially the same, regardless of the timing of the accelerator off operation and other external disturbances (for example, variations in the road surface resistance or air resistance), and the like, provided that the actual accelerator off operation is performed within the first time period from the earliest timing to the latest timing. As a result of this, the driving assistance apparatus 301 is able to restrict the occurrence of variation in the combination of the actual brake operation start position and brake operation start speed, in relation to the combination of the target brake operation start position and target brake operation start speed by which the vehicle can approach the stop position at the optimal target brake deceleration rate A_brake when the driver performs a brake operation.

The driving assistance apparatus 301 relating to the embodiment described above is able to assist the driver with driving of the vehicle 2 in a readily comprehensible manner at a suitable timing, and therefore suitable driving assistance can be provided, for example, economy driving by the driver can be assisted suitably, thereby suppressing the usage of fuel and improving fuel consumption.

Moreover, in the driving assistance apparatus 301 relating to the embodiment described above, the target travel state quantity is the target brake operation start speed, and the earliest timing and latest timing are computed on the basis of the same target brake operation start speed and different accelerator off deceleration rates. Consequently, the driving assistance apparatus 301 can prevent the first time period from the earliest timing to the latest timing from becoming too short, and is therefore able to provide more suitable driving assistance to the driver.

Moreover, the driving assistance apparatus 301 relating to the embodiment described above is provided with an ECU 50 which controls the rate of deceleration of the vehicle 2 until a brake operation is performed, in accordance with the accelerator off timing (cancellation timing) in the first time period from the earliest timing to the latest timing. Therefore, the driving assistance apparatus 301 is able to prevent the combination of the brake operation start position and the brake operation start speed from being other than the target combination, and consequently, the occurrence of variation in the combination of the actual brake operation start position and brake operation start speed can be suppressed and it is possible to avoid causing a strange impression to the driver.

The driving assistance apparatus relating to the embodiments of the invention described above are not limited to the embodiments given above, and various modifications can be made within the scope of the claims. The driving assistance apparatus relating to the embodiments can also be composed by suitably combining constituent elements of the embodiments described above.

In the description given above, the assistance control apparatus and the deceleration rate control apparatus are described as being shared with the ECU 50, but the invention is not limited to this. For example, the assistance control apparatus and the deceleration rate control apparatus may respectively be composed separately from the ECU 50, and mutually exchange information, such as detection signals, drive signals, control commands, and the like.

In the description given above, the first mode of the driving assistance information in the first time period is a mode which changes the driving assistance information as time passes, whereas the second mode of the driving assistance information in the second time period is a mode which does not change the driving assistance information as time passes, but the invention is not limited to this. The first mode and the second mode are not limited to the foregoing and may be different modes.

In the description given above, the target travel state quantity is the target brake operation start speed, which is a recommended vehicle speed at which a brake operation (braking request operation) by the user is recommended, but the invention is not limited to this. The target travel state quantity may be a target state quantity which indicates a travel state of the vehicle, for example, it may be a target vehicle acceleration or deceleration rate, a target speed ratio (target gear), a target steering angle, or the like.

In the description given above, the recommended driving operation which the driving assistance apparatus guides and assists the driver to perform, in other words, the driving assisted by the driving assistance apparatus is an accelerator off operation (cancellation of an acceleration request operation) performed by the driver, but the invention is not limited to this. The recommended driving operation which the driving assistance apparatus guides and assists the driver to perform may be, for example, an acceleration request operation, a braking request operation, a braking request cancellation operation, a gear change operation, a steering operation, or the like.

In the description given above, the driving assistance apparatus outputs visual information as driving assistance information, but the invention is not limited to this. The driving assistance apparatus may also output sound information or tactile information, for example, as driving assistance information, and may suitably vary the mode of this sound information or tactile information.

In the description given above, the earliest timing and the latest timing are computed on the basis of the same accelerator off deceleration rate and different target brake operation start speeds, or on the basis of the same target brake operation start speed and different accelerator off deceleration rates, but the invention is not limited to this. For example, the earliest timing and the latest timing may be computed on the basis of different accelerator off deceleration rates and different brake operation start speeds.

1, 201, 301 driving assistance apparatus
2 vehicle
3 vehicle control system
4 HMI apparatus (assistance apparatus)
5 engine (internal combustion engine)
6 motor-generator
13 GPS apparatus
14 wireless communications apparatus
15 database
50 ECU (assistance control apparatus, deceleration rate control apparatus)
51 first information computation unit
52 second information computation unit
53 vehicle control unit
54 CAN

The invention claimed is:
1. A driving assistance apparatus comprising:
an assistance apparatus that provides assistance for prompting a recommended driving operation by outputting driving assistance information for assisting driving of a vehicle on the basis of a target travel state quantity of the vehicle at a prescribed location to provide driving assistance in such a manner that a travel state quantity of the vehicle becomes the target travel state quantity at the prescribed location; and
an assistance control apparatus that controls the assistance apparatus to change a mode of the driving assistance information between a time period from a first assistance timing based on a current travel state quantity of the vehicle and a target travel state quantity at a prescribed location to a second assistance timing, which is based on a current travel state quantity of the vehicle and a target travel state quantity at a prescribed location and which is subsequent to the first assistance timing, and a time period from the second assistance timing onwards.

2. The driving assistance apparatus according to claim 1, wherein the assistance control apparatus changes the mode of the driving assistance information as time passes, in the time period from the first assistance timing to the second assistance timing.

3. The driving assistance apparatus according to claim 1, wherein the first assistance timing and the second assistance timing are computed on the basis of the target travel state quantity and a rate of deceleration of the vehicle in a state where an acceleration request operation and a braking request operation to the vehicle are cancelled.

4. The driving assistance apparatus according to claim 3, wherein
the target travel state quantity is a recommended vehicle speed at which the braking request operation is recommended; and
the first assistance timing and the second assistance timing are computed on the basis of a same rate of deceleration of the vehicle travelling to a prescribed location, and different recommended vehicle speeds at different prescribed locations.

5. The driving assistance apparatus according to claim 3, wherein
the target travel state quantity is a recommended vehicle speed at which the braking request operation is recommended; and
the first assistance timing and the second assistance timing are computed on the basis of a same recommended vehicle speed at a same prescribed location, and different rates of deceleration of the vehicle travelling to a prescribed location.

6. The driving assistance apparatus according to claim 3, further comprising a deceleration rate control apparatus that controls a rate of deceleration of the vehicle until the braking request operation is performed, in accordance with a cancellation timing of the acceleration request operation in a time period from the first assistance timing to the second assistance timing.

7. The driving assistance apparatus according to claim 1, wherein the vehicle is a hybrid vehicle having an internal combustion engine and an electric motor as travel drive sources.

8. The driving assistance apparatus according to claim 1, wherein the assistance control apparatus controls the assistance apparatus on the basis of the target travel state quantity at a prescribed location.

9. The driving assistance apparatus according to claim 1, wherein the assistance apparatus provides assistance to prompt a recommended driving operation, by outputting the driving assistance information.

10. The driving assistance apparatus according to claim 9, wherein
the first assistance timing is an earliest timing by which the travel state quantity of the vehicle is to become the target travel state quantity at the prescribed location, by performing the recommended driving operation; and
the second assistance timing is a latest timing by which the travel state quantity of the vehicle is to become the target travel state quantity at the prescribed location, by performing the recommended driving operation.

* * * * *